(12) United States Patent
Xu

(10) Patent No.: US 8,693,191 B2
(45) Date of Patent: Apr. 8, 2014

(54) LOCK DEVICE FOR LATCHING DIFFERENT CASINGS OF A PORTABLE ELECTRONIC DEVICE AND PORTABLE ELECTRONIC DEVICE THEREWITH

(75) Inventor: Tao Xu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 96 days.

(21) Appl. No.: 13/528,854

(22) Filed: Jun. 21, 2012

(65) Prior Publication Data
US 2013/0107431 A1 May 2, 2013

(30) Foreign Application Priority Data
Oct. 26, 2011 (CN) .......................... 2011 1 0329400

(51) Int. Cl.
*G06F 1/16* (2006.01)
*H05K 5/00* (2006.01)
*H05K 7/00* (2006.01)

(52) U.S. Cl.
USPC ................................. 361/679.58; 361/679.55

(58) Field of Classification Search
USPC ......... 361/679.27, 679.55, 679.58; 312/223.1
See application file for complete search history.

(56) References Cited

U.S. PATENT DOCUMENTS

| 5,409,275 A * | 4/1995 | Yoshida et al. ............. 292/251.5 |
| 6,366,440 B1 * | 4/2002 | Kung .............................. 361/147 |
| 2005/0018393 A1 * | 1/2005 | Kuo et al. ...................... 361/683 |
| 2005/0167992 A1 * | 8/2005 | Lo et al. ...................... 292/251.5 |
| 2006/0006674 A1 * | 1/2006 | Kang et al. ................. 292/251.5 |
| 2006/0056140 A1 * | 3/2006 | Lev ................................. 361/683 |
| 2006/0098403 A1 * | 5/2006 | Smith ........................... 361/683 |
| 2007/0133156 A1 * | 6/2007 | Ligtenberg et al. ........... 361/681 |
| 2007/0138806 A1 * | 6/2007 | Ligtenberg et al. ........ 292/251.5 |
| 2008/0024964 A1 * | 1/2008 | Lev et al. ....................... 361/681 |
| 2008/0055837 A1 * | 3/2008 | Chueh et al. .................. 361/683 |
| 2009/0103261 A1 * | 4/2009 | Shih ......................... 361/679.58 |

* cited by examiner

*Primary Examiner* — Adrian S Wilson
(74) *Attorney, Agent, or Firm* — Winston Hsu; Scott Margo

(57) ABSTRACT

A lock device includes a first magnetic component, an electromagnetic member, an electromagnetic lock module and a second magnetic component. The first magnetic component is disposed inside a first casing movably in a first direction. The electromagnetic member is disposed inside a second casing movably in a second direction. The electromagnetic lock module is disposed inside the second casing for magnetizing the electromagnetic member, such that the electromagnetic member is moved in the second direction to attract the first magnetic component when the second casing is closed to the first casing. The second magnetic component is disposed inside the first casing and for activating the electromagnetic member when moving to a first activating position in the first direction, such that the electromagnetic lock module stops magnetizing the electromagnetic member, so as to release attraction between the electromagnetic member and the first magnetic component.

20 Claims, 6 Drawing Sheets

LOCK DEVICE FOR LATCHING DIFFERENT CASINGS OF A PORTABLE ELECTRONIC DEVICE AND PORTABLE ELECTRONIC DEVICE THEREWITH

BACKGROUND OF THE INVENTION

1. Field of the Invention

The present invention relates to a lock device and a portable electronic device therewith, and more particularly, to a lock device for latching different casings of a portable electronic device and the portable electronic device therewith.

2. Description of the Prior Art

With development of technology, a notebook computer has been considered a necessity by people in daily life for dealing with documentation, playing films and videos and so on. When the notebook computer is not in use, an upper casing and a lower casing of the notebook computer can be closed, and a latch device is used for latching the upper casing and the lower casing when the upper casing and the lower casing are closed, so as to fix the upper casing and the lower casing. Accordingly, it facilitates a user to carry the notebook computer. When the notebook computer is in use, it is likely to access data stored in the notebook computer for the user to perform further operation, such as data storage, data modification and so on. Accordingly, the conventional latch device is incapable of protecting the data stored in the notebook computer from access. As a result, it does not provide good data security.

SUMMARY OF THE INVENTION

Thus, the present invention provides a lock device for latching different casings of a portable electronic device and the portable electronic device therewith for solving above drawbacks.

According to the claimed invention, a lock device for latching a first casing and a second casing of a portable electronic device includes a first magnetic component, an electromagnetic member, an electromagnetic lock module and a second magnetic component. The first magnetic component is disposed inside the first casing movably in a first direction. The electromagnetic member is disposed inside the second casing movably in a second direction. The electromagnetic lock module is disposed inside the second casing for magnetizing the electromagnetic member, such that the electromagnetic member is moved in the second direction to attract the first magnetic component when the second casing is closed to the first casing, so as to fix the electromagnetic member and the first magnetic component in a latching position. The second magnetic component is disposed inside the first casing movably in the first direction for activating the electromagnetic member when moving to a first activating position, such that the electromagnetic lock module stops magnetizing the electromagnetic member, so as to release attraction between the electromagnetic member and the first magnetic component.

According to the claimed invention, the lock device further includes a switch disposed inside the first casing. The first magnetic component is for activating the switch when being pushed by the second magnetic component to a second activating position, so as to turn on the portable electronic device.

According to the claimed invention, the lock device further includes a first resilient member and a second resilient member. The first resilient member is resiliently connected to the first magnetic component for driving the first magnetic component to move from the second activating position to the first activating position. The second resilient member is resiliently connected to the second magnetic component for driving the second magnetic component to move from the first activating position to an initial position or from the second activating position to the initial position.

According to the claimed invention, the lock device further includes a resilient member resiliently connected to the electromagnetic member and the electromagnetic lock module for providing the electromagnetic member with a resilient force when the electromagnetic lock module stops magnetizing the electromagnetic member, so as to drive the electromagnetic member from the latching position to a released position. The resilient force is smaller than a magnetically attractive force between the magnetized electromagnetic member and the first magnetic component.

According to the claimed invention, the first resilient member is compressed when the first magnetic component is located in the second activating position, and the second resilient member is stretched when the first magnetic component is located in the first activating position or in the second activating position.

According to the claimed invention, a protrusion is formed on a side corresponding to the switch of the first magnetic component, and the protrusion is for activating the switch when the first magnetic component is pushed to the second activating position by the second magnetic component.

According to the claimed invention, the lock device further includes a push button combined with the second magnetic component for driving the second magnetic component to move toward the first magnetic component in the first direction.

According to the claimed invention, the lock device further includes an input module and a processing unit. The input module is for inputting a password. The processing unit is coupled to the input module and the electromagnetic lock module. The processing unit is for controlling the input module to display an input message when the second magnetic component activates the electromagnetic member and being further for controlling the electromagnetic lock module to stop magnetizing the electromagnetic member when the password input by the input module is identical to a default password.

According to the claimed invention, the first direction is substantially perpendicular to the second direction.

According to the claimed invention, a portable electronic device includes a first casing, a second casing and a lock device. The second casing is pivoted to the first casing. The lock device is for latching the first casing and the second casing and includes a first magnetic component, an electromagnetic member, an electromagnetic lock module and a second magnetic component. The first magnetic component is disposed inside the first casing movably in a first direction. The electromagnetic member is disposed inside the second casing and movably in a second direction. The electromagnetic lock module is disposed inside the second casing for magnetizing the electromagnetic member, such that the electromagnetic member is moved in the second direction to attract the first magnetic component when the second casing is closed to the first casing, so as to fix the electromagnetic member and the first magnetic component in a latching position. The second magnetic component is disposed inside the first casing movably in the first direction for activating the electromagnetic member when moving to a first activating position, such that the electromagnetic lock module stops magnetizing the electromagnetic member, so as to release attraction between the electromagnetic member and the first magnetic component.

In summary, the lock device of the present invention utilizes the magnetic attractive force between the electromagnetic member and the first magnetic component to fix the first casing and the second casing when the second casing of the portable electronic device is closed to the first casing of the portable electronic device, so as to facilitate the portable electronic computer to be contained or carried. In addition, when the portable electronic computer is desired to be in use, it requires a user to input the password by the input module. When the password input by the input module is identical to the default password, the electromagnetic lock module stops magnetizing the electromagnetic member, so as to release the attraction between the electromagnetic member and the first magnetic component. As a result, the lock device of the present invention can be designed to require the password for turning on the portable electronic device when the portable electronic device is desired to be in use, so as to access data stored or being processed in the notebook computer for the user to perform further operation, such as data storage, data modification and so on. Accordingly, the lock device of the present invention can protect the data stored or being processed in the notebook computer, so as to enhance data security.

These and other objectives of the present invention will no doubt become obvious to those of ordinary skill in the art after reading the following detailed description of the embodiment that is illustrated in the various figures and drawings.

DETAILED DESCRIPTION

Figure 1:
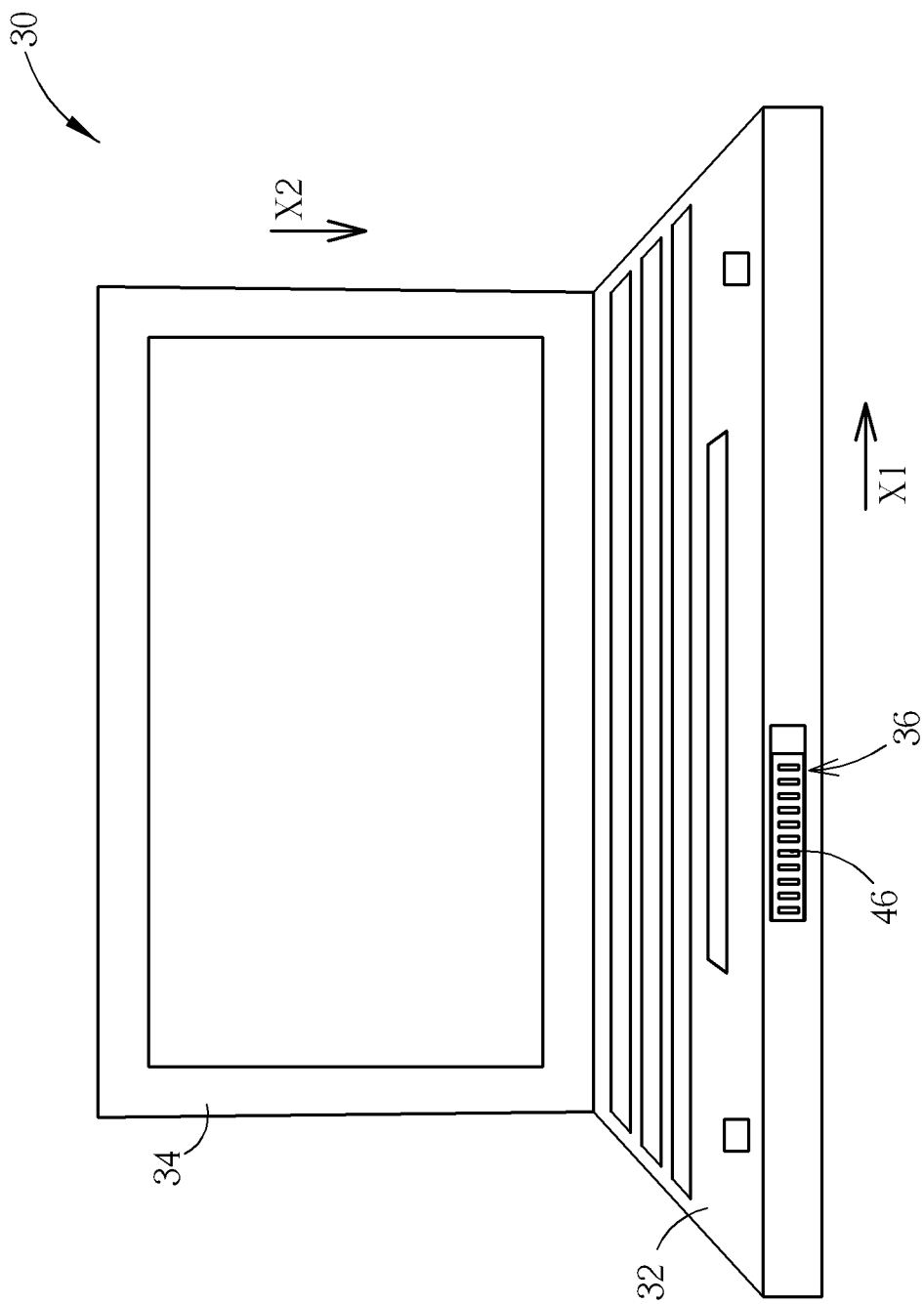
FIG. 1 is a diagram of a portable electronic device according to an embodiment of the present invention.

Please refer to FIG. 1. FIG. 1 is a diagram of a portable electronic device 30 according to an embodiment of the present invention. As shown in FIG. 1, the portable electronic device 30 includes a first casing 32 and a second casing 34. In this embodiment, the portable electronic device 30 can preferably be a notebook computer, the first casing 32 can be a host casing of the notebook computer for covering a main board, an optical disk drive, a hardware drive and so on, and the second casing 34 can be a panel module of the notebook computer for covering a display panel, a backlight module and so on.

In addition, the second casing 34 is pivoted to the first casing 32, such that the second casing 34 can be opened or closed relative to the first casing 32. When the second casing 34 is opened relative to the first casing 32, a user can operate the portable electronic device 30, such as dealing with documentation, playing films and videos and so on. On the other hand, when the second casing 34 is closed relative to the first casing 32, it facilitates the portable electronic device 30 to be contained or carried on.

Figure 2:
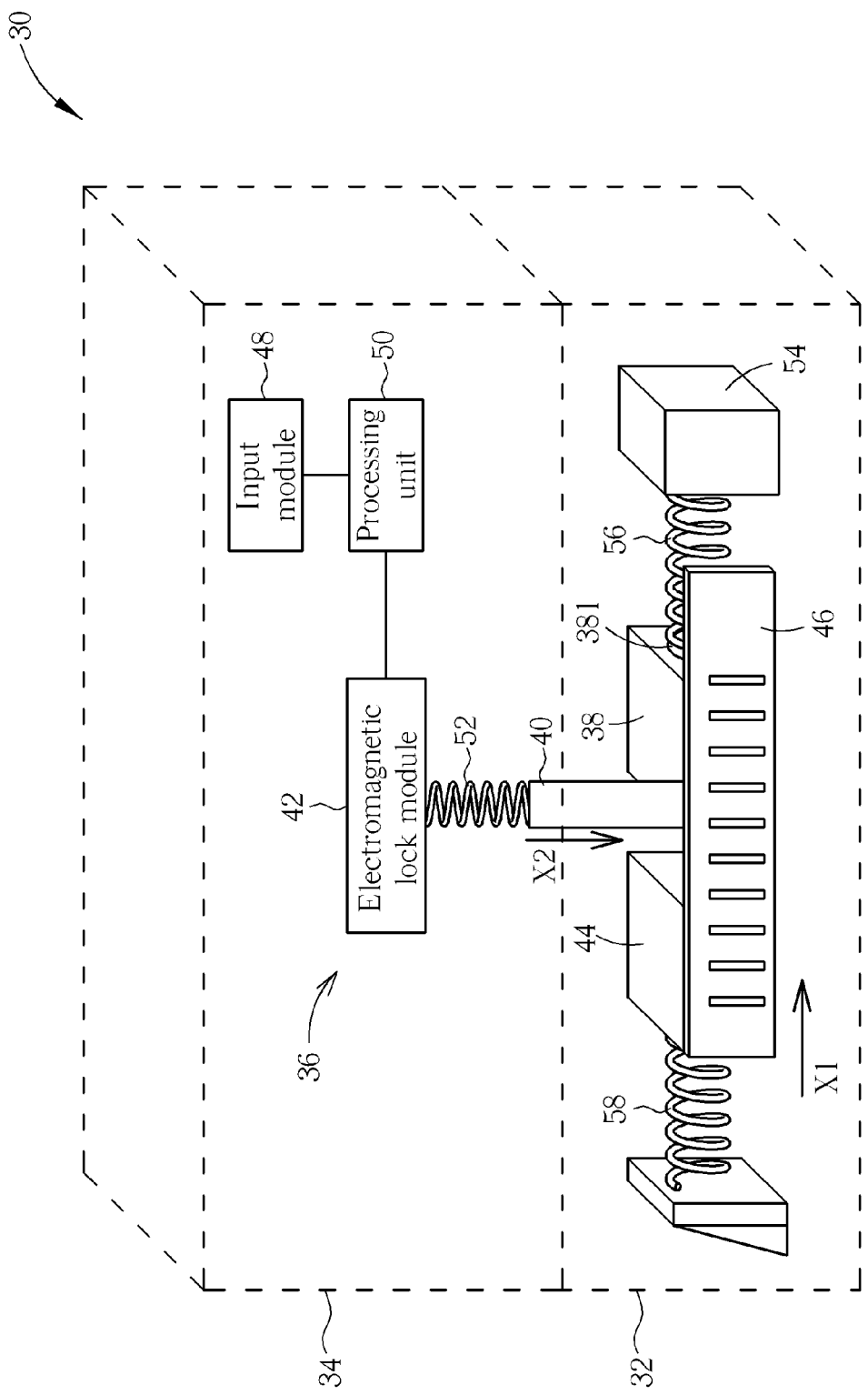
FIG. 2 is a diagram of a lock device when the portable electronic device is in a closed status according to the embodiment of the present invention.

Furthermore, the portable electronic device 30 includes a lock device 36 for latching the first casing 32 and the second casing 34. Accordingly, the lock device 36 can fix the first casing 32 and the second casing 34 when the second casing 34 is closed relative to the first casing 32, so as to facilitate the portable electronic device 30 to be contained or carried on. Please refer to FIG. 2. FIG. 2 is a diagram of the lock device 36 when the portable electronic device 30 is in a closed status according to the embodiment of the present invention. As shown in FIG. 2, the lock device 36 includes a first magnetic component 38, an electromagnetic member 40, an electromagnetic lock module 42, a second magnetic component 44 and a push button 46. The first magnetic component 38 is disposed inside the first casing 32 movably in a first direction X1, and the electromagnetic member 40 is disposed inside the second casing 34 movably in a second direction X2. The second magnetic component 44 is disposed inside the first casing 32 movably in the first direction X1. The push button 46 is combined with the second magnetic component 44 and exposed from the first casing 32, as shown in FIG. 1. In such a manner, the push button 46 can be pushed by the user for driving the second magnetic component 44 to move toward the first magnetic component 38 in the first direction X1.

In this embodiment, the first magnetic component 38 and the second magnetic component 44 are capable of moving in a direction parallel to a long side of the first casing 32, as shown in FIG. 1, and the electromagnetic member 40 is capable of moving in a direction perpendicular to the direction parallel to the long side of the first casing 32. In other words, the first direction X1 can be substantially perpendicular to the second direction X2. In addition, the electromagnetic lock module 42 is disposed inside the second casing 34 for magnetizing the electromagnetic member 40. When the second casing 34 is closed to the first casing 32, the electromagnetic member 40 magnetized by the electromagnetic lock module 42 can be abstracted by the first magnetic component 38, such that the electromagnetic member 40 is moved in the second direction X2 to attract the first magnetic component 38. Accordingly, the electromagnetic member 40 and the first magnetic component 38 can be fixed in a latching position, as shown in FIG. 2. In such a manner, the lock device 36 can latch the first casing 32 and the second casing 34, such that the portable electronic device 30 is in the closed status, so as to facilitate the portable electronic device 30 to be contained or to be carried on.

Figure 3:
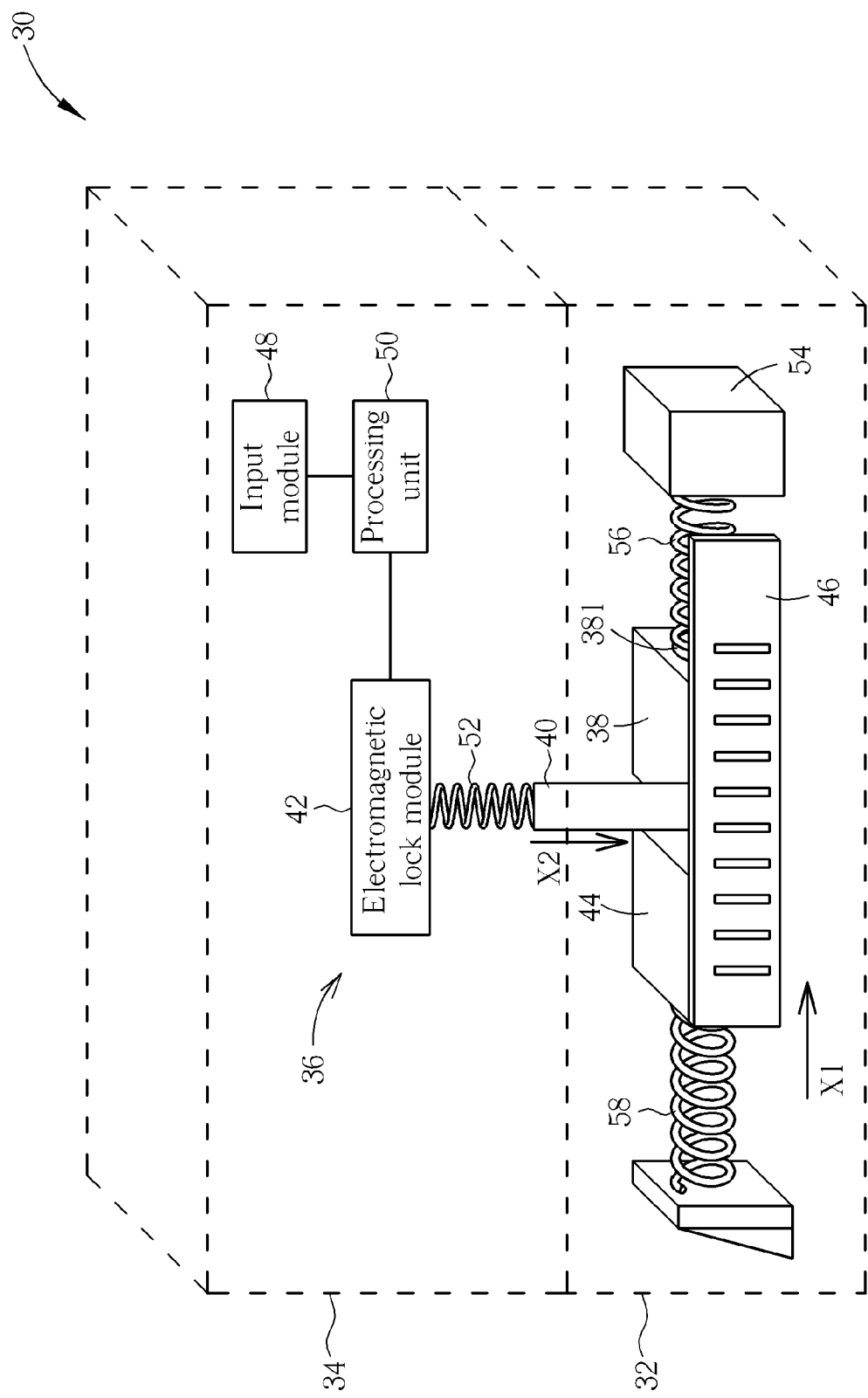
FIG. 3 is a diagram illustrating that a second magnetic component moves to a first activating position according to the embodiment of the present invention.

In addition, the lock device 36 includes an input module 48 and a processing unit 50. The processing unit 50 is coupled to the input module 48 and the electromagnetic lock module 42. Please refer to FIG. 2 and FIG. 3. FIG. 3 is a diagram illustrating that the second magnetic component 44 moves to a first activating position according to the embodiment of the present invention. As shown in FIG. 2 and FIG. 3, when the portable electronic device 30 is in use, the push button 46 is pushed from a position as shown in FIG. 2 to a position shown in FIG. 3, so as to drive the second magnetic component 44 from an initial position in FIG. 2 to the first activating position in FIG. 3. Accordingly, the second magnetic component 44 is coupled to the electromagnetic member 40, so as to transmit the corresponding signal to the processing unit 50. In the meanwhile, the processing unit 50 can control the input module 48 to display an input message. In this embodiment, the input module 48 can be a touch panel disposed on the second casing 34, and the input message can be a graphical user interface for input prompt on the touch panel. When the second magnetic component 44 is coupled to the electromagnetic member 40, the processing unit 50 can display the input message on the touch panel, so as to notice the user to input a password by the user input interface. When the password input by the input module 48 is identical to the default password, the processing unit 50 controls the electromagnetic lock module 42 to stop magnetizing the electromagnetic member 40, so as to release attraction between the electromagnetic member 40 and the first magnetic component 38. Accordingly, the lock device 36 no longer latches the first casing 32 and the second casing 34. In such a manner, the second casing 34 can be opened relative to the first casing 32 for the user to operate the portable electronic device 30.

Figure 4:
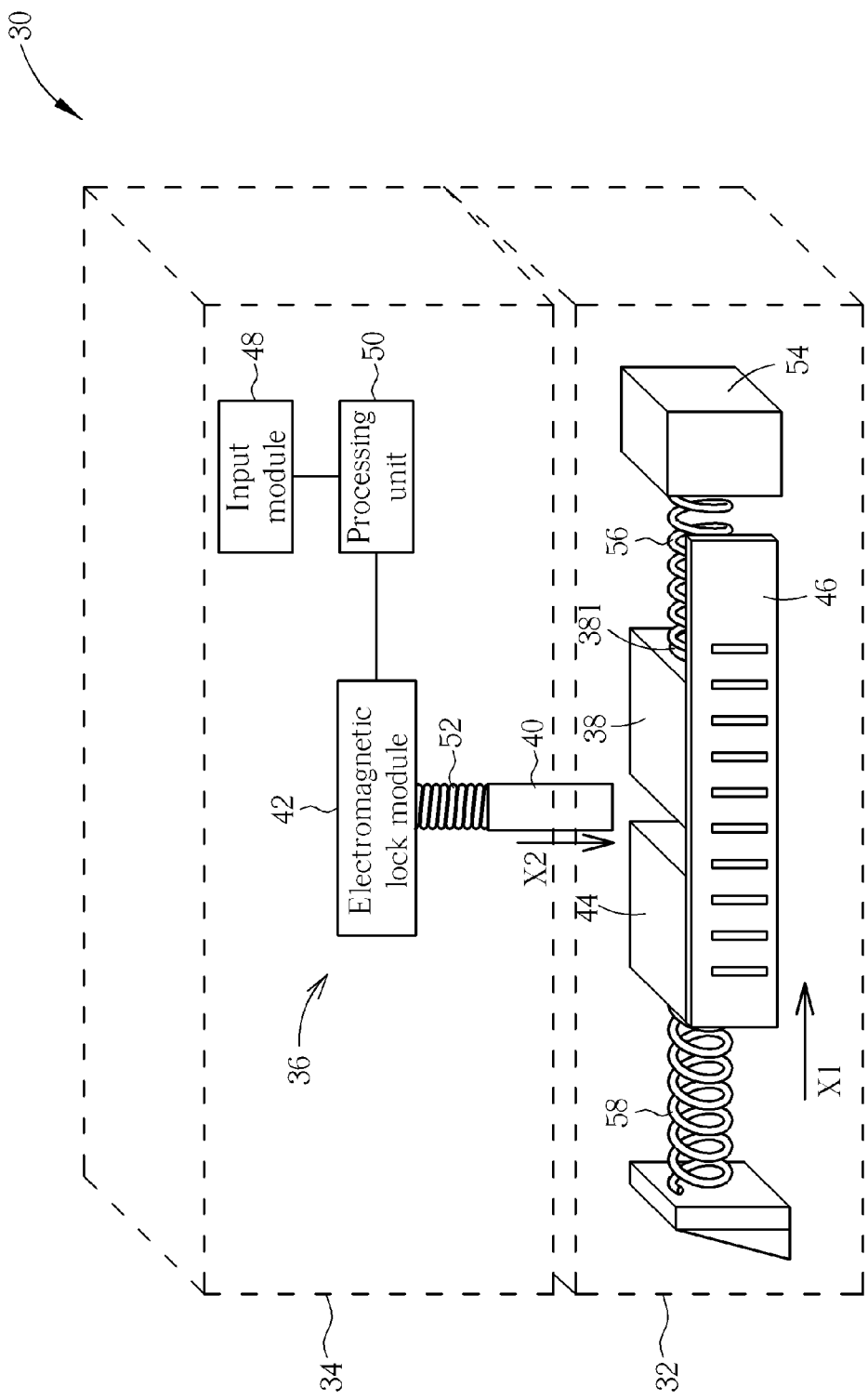
FIG. 4 is a diagram illustrating that an electromagnetic member is in a released position according to the embodiment of the present invention.

It should be noticed that the input module 48 can not be limited to the aforesaid touch panel. For example, the input module 48 can be a key switch module as well for the user to key in the password by the key switch module. As for which one of the above-mentioned designs is adopted, it depends on practical demands. In addition, the lock device 36 can further includes a resilient member 52 resiliently connected to the electromagnetic member 40 and the electromagnetic lock module 42. Please refer to FIG. 3 and FIG. 4. FIG. 4 is a diagram illustrating that the electromagnetic member 40 is in a released position according to the embodiment of the present invention. As shown in FIG. 3 and FIG. 4, when the electromagnetic lock module 42 stops magnetizing the electromagnetic member 40, the resilient member 52 can provide the electromagnetic member 40 with a resilient force, so as to drive the electromagnetic member 40 to move from the latching position shown in FIG. 3 to the released position shown in FIG. 4. Accordingly, the electromagnetic member 40 can be withdrawn inside the second casing 34 when the second casing 34 is opened relative to the first casing 32.

In practical application, the resilient force provided by the resilient member 52 can be designed to be smaller than a magnetic attractive force between the magnetized electromagnetic member 40 and the first magnetic component 38. In such a manner, when the electromagnetic lock module 42 magnetizes the electromagnetic member 40, the magnetic attractive force between the magnetized electromagnetic member 40 and the first magnetic component 38 can overcome the resilient force provided by the resilient member 52, such that the electromagnetic member 40 is moved from the released position in FIG. 4 to the latching position in FIG. 3 for latching the first casing 32 and the second casing 34. When the electromagnetic lock module 42 stops magnetizing the electromagnetic member 40, the magnetic attractive force between the electromagnetic member 40 and the first magnetic component 38 vanishes accordingly. Therefore, the resilient force provided by the resilient member 52 drives the electromagnetic member 40 to move from the latching position in FIG. 3 to the released position in FIG. 4. In the meanwhile, the second casing 34 can be opened relative to the first casing 32 for the user to operate.

Figure 5:
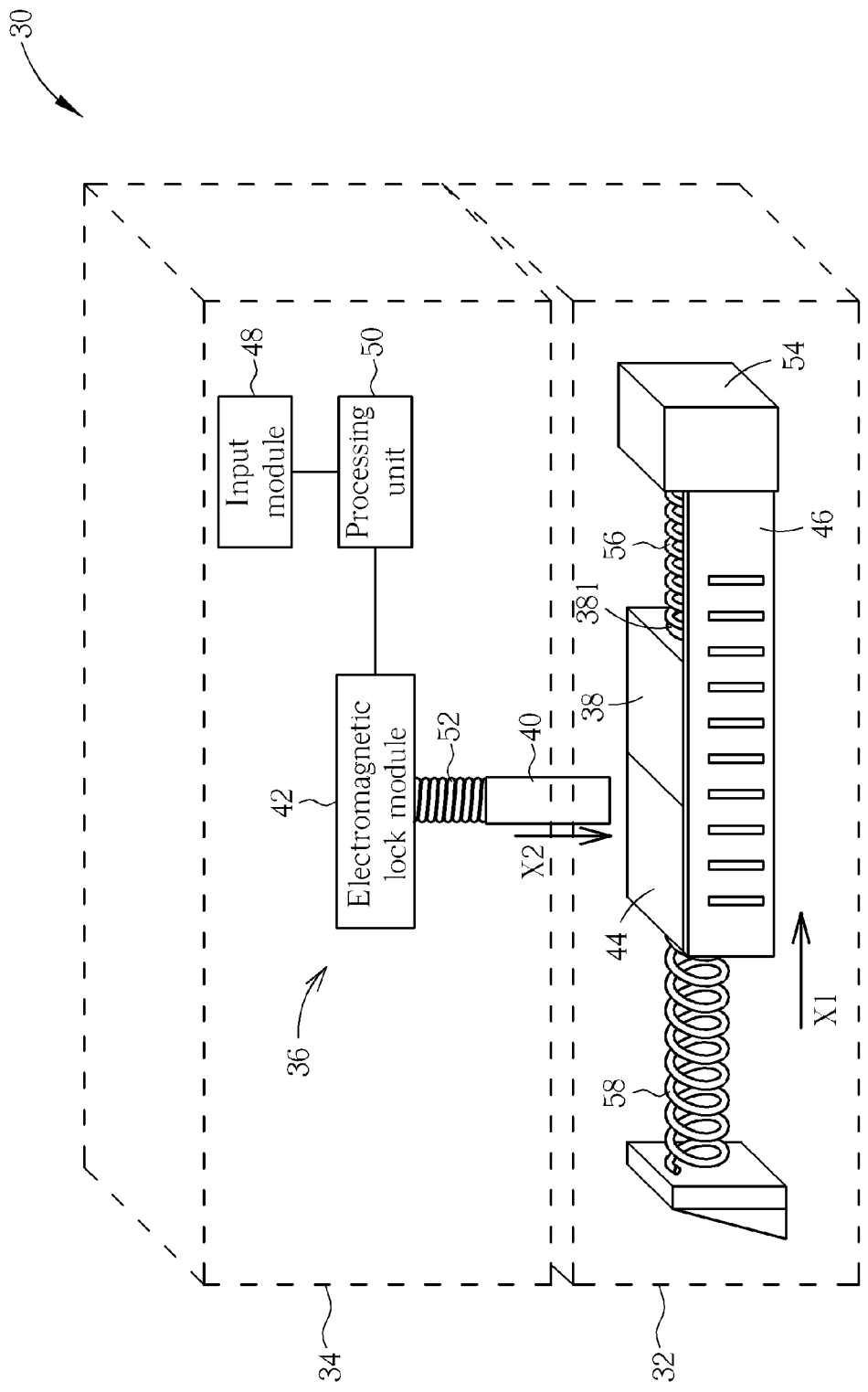
FIG. 5 is a diagram illustrating that the first magnetic component is in a second activating position according to the embodiment of the present invention.
Figure 6:
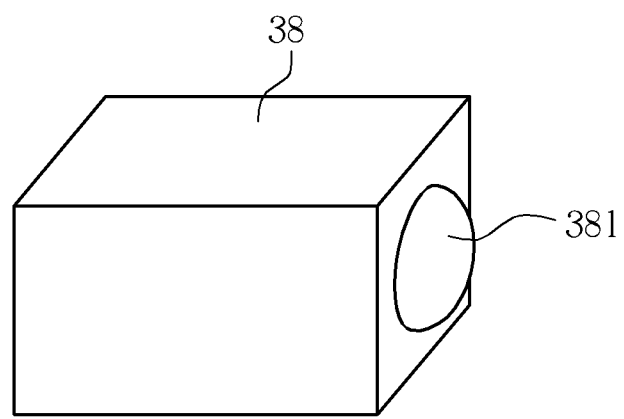
FIG. 6 is an enlarged diagram of the first magnetic component according to the embodiment of the present invention.

In addition, the lock device 36 of the present invention can selectively include a switch 54 disposed inside the first casing 32. Please refer to FIG. 4 to FIG. 6. FIG. 5 is a diagram illustrating that the first magnetic component 38 is in a second activating position according to the embodiment of the present invention. FIG. 6 is an enlarged diagram of the first magnetic component 38 according to the embodiment of the present invention. As shown in FIG. 4 to FIG. 6, a protrusion 381 is formed on a side corresponding to the switch 54 of the first magnetic component 38. When the lock device 36 no longer latches the first casing 32 and the second casing 34, the pushbutton 46 can be further pushed to move in the first direction X1. In the meanwhile, the push button 46 drives the second magnetic component 44, so as to push the first magnetic component 38 to move in the first direction X1. When the second magnetic component 44 pushes the first magnetic component 38 to move to the second activating position shown in FIG. 5, the protrusion 381 on the first magnetic component 38 can activate the switch 54, so as to perform the corresponding operation. For example, the portable electronic device 30 can be turned on for the operation, such as documentation, playing films and videos and so on.

It should be noticed that the switch 54 and the protrusion 381 on the first magnetic component 38 can be omitted herein. In other words, the portable electronic device 30 of the present invention can include a conventional power button instead. When the lock device 36 no longer latches the first casing 32 and the second casing 34, the portable electronic device 30 can be turned on by the conventional power button for the operation, such as documentation, playing films and videos and so on.

In addition, the lock device 36 of the present invention can further include a first resilient member 56 and a second resilient member 58. The first resilient member 56 is resiliently connected to the first magnetic component 38, and the second resilient member 58 is resiliently connected to the second magnetic component 44. In practically application, when the first magnetic component 38 is located in the second activating position in FIG. 5, the first resilient member 56 is compressed. Accordingly, when the push button is released from the second activating position, the first resilient member 56 provides the first magnetic component 38 with a resilient force by releasing resilient potential energy. As a result, the first magnetic component 38 can be driven to move from the second activating position in FIG. 5 to the first activating position in FIG. 4. Similarly, when the second magnetic component 44 is located in the second activating position in FIG. 5, the second resilient member 58 is stretched. Accordingly, when the push button 46 is released from the second activating position, the second resilient member 58 provides the second magnetic component 44 with a resilient force by releasing resilient potential energy. As a result, the second magnetic component 44 can be driven to move from the second activating position in FIG. 5 to the initial position in FIG. 2. On the other hand, when the second magnetic component 44 is located in the first activating position in FIG. 4, the second resilient member 58 is stretched. Accordingly, when the push button 46 is released from the first activating position, the second resilient member 58 provides the second magnetic component 44 with a resilient force by releasing resilient potential energy. As a result, the second magnetic component 44 can be driven to move from the first activating position in FIG. 4 to the initial position in FIG. 2.

In contrast to the prior art, the lock device of the present invention utilizes the magnetic attractive force between the electromagnetic member and the first magnetic component to fix the first casing and the second casing when the second casing of the portable electronic device is closed to the first casing of the portable electronic device, so as to facilitate the portable electronic computer to be contained or carried. In addition, when the portable electronic computer is desired to be in use, it requires a user to input the password by the input module. When the password input by the input module is identical to the default password, the electromagnetic lock module stops magnetizing the electromagnetic member, so as to release the attraction between the electromagnetic member and the first magnetic component. As a result, the lock device of the present invention can be designed to require the password for turning on the portable electronic device when the portable electronic device is desired to be in use, so as to access data stored or being processed in the notebook computer for the user to perform further operation, such as data storage, data modification and so on. Accordingly, the lock device of the present invention can protect the data stored or being processed in the notebook computer, so as to enhance data security.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lock device for latching a first casing and a second casing of a portable electronic device, the lock device comprising:
 a first magnetic component disposed inside the first casing movably in a first direction;
 an electromagnetic member disposed inside the second casing movably in a second direction;
 an electromagnetic lock module disposed inside the second casing for magnetizing the electromagnetic member, such that the electromagnetic member is moved in the second direction to attract the first magnetic component when the second casing is closed to the first casing, so as to fix the electromagnetic member and the first magnetic component in a latching position; and
 a second magnetic component disposed inside the first casing movably in the first direction for activating the electromagnetic member when moving to a first activating position, such that the electromagnetic lock module stops magnetizing the electromagnetic member, so as to release attraction between the electromagnetic member and the first magnetic component.

2. The lock device of claim 1, further comprising:
 a switch disposed inside the first casing, the first magnetic component being for activating the switch when being pushed by the second magnetic component to a second activating position, so as to turn on the portable electronic device.

3. The lock device of claim 2, further comprising:
 a first resilient member resiliently connected to the first magnetic component for driving the first magnetic component to move from the second activating position to the first activating position; and
 a second resilient member resiliently connected to the second magnetic component for driving the second magnetic component to move from the first activating position to an initial position or from the second activating position to the initial position.

4. The lock device of claim 3, further comprising:
 a resilient member resiliently connected to the electromagnetic member and the electromagnetic lock module for providing the electromagnetic member with a resilient force when the electromagnetic lock module stops magnetizing the electromagnetic member, so as to drive the electromagnetic member from the latching position to a released position, wherein the resilient force is smaller than a magnetic attractive force between the magnetized electromagnetic member and the first magnetic component.

5. The lock device of claim 3, wherein the first resilient member is compressed when the first magnetic component is located in the second activating position, and the second resilient member is stretched when the first magnetic component is located in the first activating position or in the second activating position.

6. The lock device of claim 5, wherein a protrusion is formed on a side corresponding to the switch of the first magnetic component, and the protrusion is for activating the switch when the first magnetic component is pushed to the second activating position by the second magnetic component.

7. The lock device of claim 6, further comprising:
 a resilient member resiliently connected to the electromagnetic member and the electromagnetic lock module for providing the electromagnetic member with a resilient force when the electromagnetic lock module stops magnetizing the electromagnetic member, so as to drive the electromagnetic member from the latching position to a released position, wherein the resilient force is smaller than a magnetic attractive force between the magnetized electromagnetic member and the first magnetic component.

8. The lock device of claim 7, further comprising:
 a push button combined with the second magnetic component for driving the second magnetic component to move toward the first magnetic component in the first direction.

9. The lock device of claim 8, further comprising:
 an input module for inputting a password; and
 a processing unit coupled to the input module and the electromagnetic lock module, the processing unit being for controlling the input module to display an input message when the second magnetic component activates the electromagnetic member and being further for controlling the electromagnetic lock module to stop magnetizing the electromagnetic member when the password input by the input module is identical to a default password.

10. The lock device of claim 1, wherein the first direction is substantially perpendicular to the second direction.

11. The lock device of claim 1, further comprising:
 a push button combined with the second magnetic component for driving the second magnetic component to move toward the first magnetic component in the first direction.

12. The lock device of claim 1, further comprising:
 a resilient member resiliently connected to the electromagnetic member and the electromagnetic lock module for providing the electromagnetic member with a resilient force when the electromagnetic lock module stops magnetizing the electromagnetic member, so as to drive the electromagnetic member from the latching position to a released position, wherein the resilient force is smaller than a magnetically attractive force between the magnetized electromagnetic member and the first magnetic component.

13. A portable electronic device, comprising:
 a first casing;
 a second casing pivoted to the first casing; and
 a lock device for latching the first casing and the second casing, the lock device comprising:
  a first magnetic component disposed inside the first casing movably in a first direction;
  an electromagnetic member disposed inside the second casing movably in a second direction;
  an electromagnetic lock module disposed inside the second casing for magnetizing the electromagnetic member, such that the electromagnetic member is moved in the second direction to attract the first magnetic component when the second casing is closed to the first casing, so as to fix the electromagnetic member and the first magnetic component in a latching position; and a second magnetic component disposed inside the first casing movably in the first direction for activating the electromagnetic member when moving to a first activating position, such that the electromagnetic lock module stops magnetizing the electromagnetic member, so as to release attraction between the electromagnetic member and the first magnetic component.

14. The portable electronic device of claim 13, further comprising:

a switch disposed inside the first casing, the first magnetic component being for activating the switch when being pushed by the second magnetic component to a second activating position, so as to turn on the portable electronic device.

15. The portable electronic device of claim 14, further comprising:

a first resilient member resiliently connected to the first magnetic component for driving the first magnetic component to move from the second activating position to the first activating position; and a second resilient member resiliently connected to the second magnetic component for driving the second magnetic component to move from the first activating position to an initial position or from the second activating position to the initial position.

16. The portable electronic device of claim 15, further comprising:

a resilient member resiliently connected to the electromagnetic member and the electromagnetic lock module for providing the electromagnetic member with a resilient force when the electromagnetic lock module stops magnetizing the electromagnetic member, so as to drive the electromagnetic member from the latching position to a released position, wherein the resilient force is smaller than a magnetically attractive force between the magnetized electromagnetic member and the first magnetic component.

17. The portable electronic device of claim 15, wherein the first resilient member is compressed when the first magnetic component is located in the second activating position, and the second resilient member is stretched when the first magnetic component is located in the first activating position or in the second activating position.

18. The portable electronic device of claim 17, wherein a protrusion is formed on a side corresponding to the switch of the first magnetic component, and the protrusion is for activating the switch when the first magnetic component is pushed to the second activating position by the second magnetic component.

19. The portable electronic device of claim 18, further comprising:

a resilient member resiliently connected to the electromagnetic member and the electromagnetic lock module for providing the electromagnetic member with a resilient force when the electromagnetic lock module stops magnetizing the electromagnetic member, so as to drive the electromagnetic member from the latching position to a released position, wherein the resilient force is smaller than a magnetically attractive force between the magnetized electromagnetic member and the first magnetic component.

20. The portable electronic device of claim 19, further comprising:

a push button combined with the second magnetic component for driving the second magnetic component to move toward the first magnetic component in the first direction.

* * * * *